United States Patent
Foster et al.

[15] 3,689,874
[45] Sept. 5, 1972

[54] PROCESSING OF GEOPHYSICAL DATA

[72] Inventors: Manus R. Foster, 1122 S. Edward; Clyde W. Kerns, 2830 Yorkshire, both of Irving, Tex. 75060; Raymond L. Sengbush, 1209 Plattner Drive, Grand Prairie, Tex. 75050

[22] Filed: Nov. 12, 1964

[21] Appl. No.: 410,526

[52] U.S. Cl. .................. 340/15.5 F, 340/15.5 CC
[51] Int. Cl. ................................. G01v 1/36
[58] Field of Search ...340/15.5, 15.5 C, 3 M, 15.5 F, 340/15.5 CC

[56] References Cited

UNITED STATES PATENTS

| 2,794,965 | 6/1957 | Yost | 340/15.5 |
|---|---|---|---|
| 3,076,177 | 1/1963 | Lawrence et al. | 340/15.5 |
| 3,131,375 | 4/1964 | Watson | 340/15.5 |
| 3,162,756 | 12/1964 | Lawrence | 340/15.5 |
| 3,193,045 | 7/1965 | Levin | 340/15.5 |
| 3,242,326 | 3/1966 | Cox | 235/181 |

OTHER PUBLICATIONS

Goupilland, Pierre L., an Approach to Inverse Filtering from Seismic Records, Geophysics, Vol. 26, N. 6, Dec. 1961, pp. 754– 760

*Primary Examiner*—Benjamin A. Borchelt
*Assistant Examiner*—N. Moskowitz
*Attorney*—William J. Scherback, Donald L. Dickerson and Sidney A. Johnson

EXEMPLARY CLAIM

16. Digital computing apparatus for processing seismograms to compensate for the effect of distortion present in obtaining said seismograms and to emphasize the characteristics of the geological formations producing said seismograms comprising:
  means for converting said seismograms to electrical signals of the type which can be operated upon by said computing apparatus,
  a correlator, said electrical signals being applied to said correlator to produce as an output an electrical signal having a distortion component representing said distortion and a reflectivity component representing said characteristics of said geological formations,
  a smoothing filter for smoothing the spectrum of the signal applied to the input, the output of said correlator being applied to said smoothing filter to smooth said spectrum thereby producing an output representing said distortion component and suppressing said reflectivity component,
  an inverter producing as an output coefficients of a filter having characteristics which are the inverse of the signal applied to the input of said inverter, the output of said smoothing filter, representing said distortion component, being applied to said inverter to produce, as an output of said inverter, filter coefficients which are the inverse of said distortion component,
  an inverse filter, said filter coefficients being applied to said inverse filter so that said inverse filter has filtering characteristics which are the inverse of said distortion,
  a filter having a broad flat signal spectrum in the seismic band, and
  means for applying said seismograms to said inverse filter and to said filter having a broad flat signal spectrum to produce an output emphasizing said characteristics of said geological formations.

17 Claims, 13 Drawing Figures

PROCESSING OF GEOPHYSICAL DATA

This invention relates to the processing of geophysical data to compensate for the effect of distortion present in obtaining said data and, more particularly, relates to a type of inverse filtering wherein the geophysical data are processed to obtain the inverse filter and wherein the inverse filter is then applied to the geophysical data in a manner which broadens the frequency band of the geophysical data.

Data regarding the characteristics of subsurface geological formations are obtained in a number of ways. One common way is by setting off a shot of dynamite and detecting the resultant seismic waves which are reflected from the reflecting interfaces of the subsurface formations. Unfortunately, all such geophysical data includes distortion which often obscures the desired characteristics of the geological formations.

In seismic exploration, this distortion often takes the form of multiple reflections, commonly referred to as ghosts and reverberations. Or, the distortion may be introduced by the instruments used in obtaining the data.

Many advances have recently been made in the processing of geophysical data to remove the distortion. For example, in U.S. Pat. Nos. 3,076,176, to P.L. Lawrence, and 3,076,177, to P.L. Lawrence and Manus R. Foster, methods are disclosed of inverse filtering a seismogram to make the seismogram more nearly representative of the character of the subsurface formations. Also, in copending application Ser. No. 284,256, filed May 29, 1963, Geophysical Data Processing, Manus R. Foster, there is disclosed a technique of inverse filtering of geophysical data and, more particularly, there is disclosed a technique for obtaining the inverse filter once the filter characteristics of the distortion are determined.

In accordance with one aspect of this invention, the distortion present in seismic data is characterized by an operation which separates the distortion component from the component representing the characteristics of the geological formation. The inverse of the distortion filter is then obtained and this inverse distortion filter is applied to the geophysical data to produce an output which emphasizes the true characteristics of the geological formations. This output is applied to a filter which has specified desirable properties such as a broad flat signal spectrum in the seismic band. This filter, which will be referred to as the D filter, renders the final output a good estimate of the geophysical data which would have been produced in the absence of the distortion.

Most processing operations which are performed on geophysical data can be characterized in either the time domain or in the frequency domain. This is equally true of the present invention which has complementary executions in both the time domain and in the frequency domain. As an example of what is meant by the time domain and the frequency domain, consider a simple filter which can be characterized in the frequency domain by the amplitude attenuation and relative phase shift of the filter as a function of frequency of the input. The filter can also be characterized in the time domain by the impulse response of the filter. This is the amplitude of the output signal as a function of time which will be produced as a result of a unit impulse being applied to the input of the filter.

As another example of the distinction between the time domain and the frequency domain, the counterpart of convolution in the time domain is multiplication in the frequency domain. For a more complete discussion of time domain filtering (convolution) and the transforms between the time domain and the frequency domain, reference is made to Statistical Theory of Communication, by Y. W. Lee, John Wiley and Sons, Inc., New York, 1961.

Briefly summarizing the implementation of this invention in the time domain, the distortion is characterized by autocorrelating a portion of the geophysical data and then multiplying the resultant autocorrelation function by a truncating function which smooths the spectrum to produce an output which characterizes the distortion. To consider a specific example, seismic traces obtained from the detonation of a shot of dynamite can be operated upon in accordance with this invention. The seismic trace represents the shot pulse which produced the trace, the reflectivity of the formations through which the shot pulse traveled, the distortion present in obtaining the trace, and coherent and random noise. It is desirable to process this trace so that it represents only the interaction of the shot pulse and the reflectivity of the formations.

In order to characterize the distortion present in the trace, a portion of the trace, referred to as a window, is first autocorrelated. The autocorrelation of an input signal is a well known operation. The manner in which a seismic trace is autocorrelated is well known in seismic data processing. The resultant autocorrelation function is then multiplied by a truncating function. In accordance with an important aspect of this invention, this truncation smooths out the ragged spectral variations in the autocorrelation function which are caused by the reflectivity and random noise. The result is an output which characterizes the distortion.

Having thus characterized the distortion, it is now possible to generate an inverse filter which is the inverse of the distortion. The seismic trace is then applied to the inverse filter and the output thereof represents primarily the reflectivity of the formations from which the seismic data was obtained. The output of the seismic data is applied to the D filter which introduces the desired shot pulse.

In this manner, there is produced a signal which approximates the signal which would have been produced by a desired shot pulse interacting with the reflectivity of the earth in the absence of any distortion.

The foregoing and other objects, features and advantages of the invention will be better understood from the following more detailed description and appended claims in conjunction with the drawings in which:

FIG. 2b is the frequency domain representation of the truncator of FIG. 2a;

Before proceeding with a description of the processing which is carried out in accordance with this invention, there will be described the nature and character of some types of distortion which are commonly present in seismic data. The seismic trace which is generated by a shot pulse may be described mathematically as follows:

$$I(t) = B(t) * H(t) * R(t) + N(t) + U(t) \quad (1)$$

where:
$I(t)$ = input (seismic trace)
$B(t)$ = shot pulse
$H(t)$ = distortion
$R(t)$ = reflectivity function
$N(t)$ = coherent noise
$U(t)$ = random noise Equation (1) states that the seismic trace is produced by the shot pulse convolved with the distortion convolved with the reflectivity, plus coherent and random noise. (Convolution is denoted by an asterisk (*).) As is well known and more particularly explained in the Lee book, referred to previously, filtering can be described by the mathematical process of convolution. The seismic trace is the result of the shot pulse being filtered by the reflectivity of the earth and by the distortion.

Figure 1A:
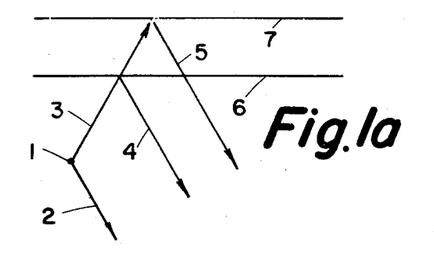
FIG. 1a depicts the production of ghosts.

This distortion takes on various forms, depending upon the cause of the distortion. As one example, refer to FIG. 1a which depicts the production of ghosts from two reflecting interfaces. A shot of dynamite 1, or another suitable seismic source, is detonated below the surface. The shot 1 generates a primary seismic wave 2 which is reflected from subsurface formations and produces, on the resultant seismic trace, indications of the nature or reflectivity of the subsurface formations. However, the seismic shot also produces a wave 3 which travels toward the surface and produces reflections 4 and 5 from the reflecting interfaces 6 and 7, respectively. These secondary waves 4 and 5 produce what are commonly referred to as ghosts on the seismic trace. These ghosts obscure the true nature of the reflectivity of the subsurface formations. The distortion introduced by these ghosts can be represented mathematically as follows:

$$H(t) = \sigma(t) - R_1 A_1(t-T_1) - R_2 A_2(t-T_2) \quad (2)$$

where:
$H(t)$ is the distortion operator,
$\sigma(t)$ is a unit impulse representing the primary seismic wave 2,
$R_1$ is the reflection coefficient of interface 6,
$A_1$ is additional filtering in the path from shot 1 to reflecting interface 6 and back to shot,
$t$ is time,
$T_1$ is the two-way travel time from the shot to interface 6 and back to the shot,
$R_2$ is the reflection coefficient of interface 7,
$A_2$ is the additional filtering in the path from the shot to the interface 7 and back to the shot, and
$T_2$ is the two-way travel time from the shot to the interface 7 and back to the shot.

In this manner, the distortion operator caused by ghosting has been represented mathematically. More generally, the distortion operator for ghosts from any number of reflecting interfaces $N$ can be stated as follows:

$$H(t) = \delta(t) - \sum_{k=1}^{N} R_k A_k(t-T_k) \quad (3)$$

where:
$R_k$ is the reflection coefficient of $k$th ghosting interface,
$A_k(t-T_k)$ is the additional earth filtering in path from shot to $k$th interface and back to shot,
$T_k$ is the two-way time from shot to $k$th interface, and
$N$ is the total number of ghosting interfaces.

It should be appreciated that a seismic trace obtained under conditions in which ghosts are produced can be represented by the shot pulse convolved with the reflectivity convolved with the distortion operator as represented by, for example, equation (2).

Also, since the character of the distortion operator is known, the inverse of the distortion operator represented by equation (2) can be determined. Then, convolution of the seismic trace with the inverse operator will produce an output which is free from distortion. The problem is in defining the distortion operator initially. In equation (2), the distortion operator was characterized for a very simple case. However, most often, the number of ghosting interfaces or other causes of distortion are not known and it is not possible to characterize the distortion in a simple manner. In accordance with this invention, there is provided a method of characterizing the distortion from the traces themselves.

Figure 1B:
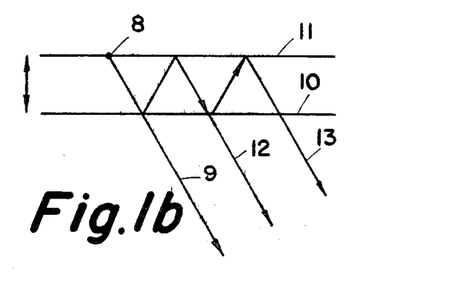
FIG. 1b depicts the production of reverberations.

Before proceeding with a more complete description of the invention, it is useful to examine some other types of distortion operators which might be present in seismic data. In FIG. 1b, there is diagrammatically shown the production of reverberations when a surface shot is exploded over a single non-attenuating layer. The shot 8 produces a primary seismic impulse 9 and also produces a reflection from the first reflecting interface 10. If the layer above the interface 10 is relatively nonattenuating, the reflected seismic impulse will continue to be reflected between the interface 10 and the surface 11, thereby producing secondary reverberations, two of which, 12 and 13, are shown. These reverberations are a particular problem where the shot is exploded near the water surface. In such case, seismic energy is reflected between the water surface and the water bottom, corresponding to the interfaces 11 and 10 respectively, in FIG. 1b.

The distortion operator which is characteristic of reverberations of this type is given by:

$$H_1(t) = \delta(t) + \sum_{k=1}^{\infty} (-R_1)^k \delta(t-kT) \quad (4)$$

where:

$R_1$ is the reflection coefficient of water bottom, and $T$ is the two-way time in water In underwater seismic exploration of this type, the location of the shot and the location of the detector both contribute to the distortion. Furthermore, shot pulse variations between shots (due to charge size or shooting conditions, for example) and the instruments used in detecting the seismic waves introduce further distortion. If each of these distortions could be accurately characterized, then the final seismic trace could be represented by the convolution of the shot pulse with each of the distortion operators and deconvolution with inverse operators would produce a distortion-free seismic trace.

The above examples indicate that the distortion takes on many varied and generally unknown forms. Also, the shot pulse, which will be denoted $B(t)$, has unknown characteristics. The distorted shot pulse which appears in the seismic trace may be represented by the following:

$$C(t) = B(f) * H(t) \quad (5)$$

where:

$C(t)$ is the distorted shot pulse, and $H(t)$ is the total distortion operator

It is the purpose of this invention to replace the distorted shot pulse $C(t)$ in the seismic trace with a shot pulse having special desirable properties such as a flat spectrum over a broad band. This will, of course, make the seismic trace much easier to interpret in an effort to determine the characteristics of the subsurface formation represented by the seismic trace.

Time Domain Processing — If the distorted shot pulse in the seismic trace is replaced with a shot pulse with special desirable properties, such as a flat spectrum over a broad band, the desired signal $\hat{S}(t)$ is given by:

$$\hat{S}(t) = D(t) * R(t) \quad (6)$$

where:

$D(t)$ is the desired shot pulse, and $R(t)$ is the reflectivity function

Figures 2, 2A:
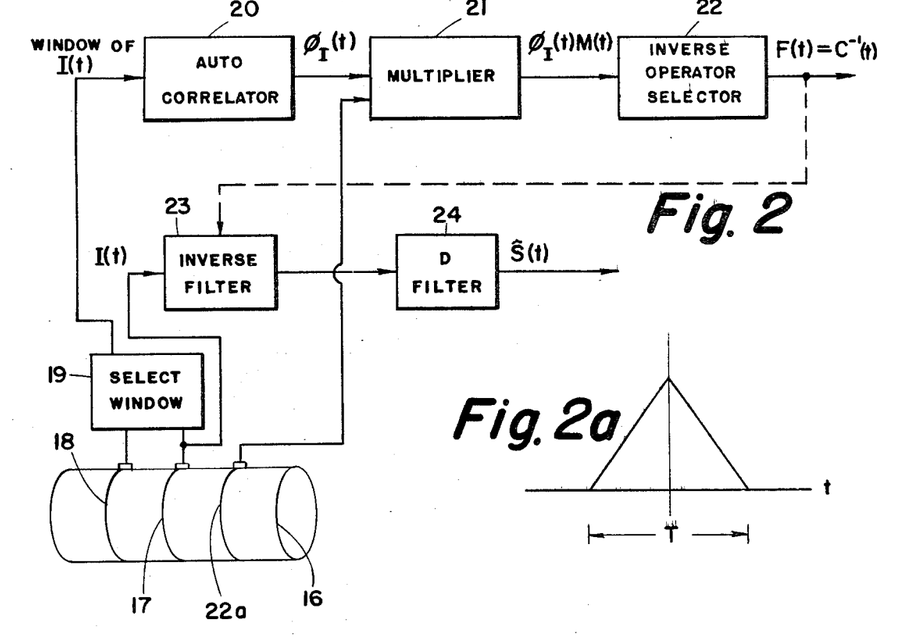
FIG. 2 shows a block diagram of the time domain implementation of the present invention.
FIG. 2a is a time domain representation of a suitable truncator.

The block diagram of a system for converting the input seismic trace $I(t)$ to the desired signal $\hat{S}(t)$ is shown in FIG. 2. The first step in the process is to select a portion, or window, of the seismic trace.

The seismic trace $I(t)$ is most often recorded on a magnetic medium such as is carried by the drum 16 which has the seismic trace recorded on one track 17. Commonly, timing marks are recorded on track 18. These timing marks are applied to selection circuitry 19 which may be used to select any desired portion of the seismic trace. The selected portion, or window, is applied to correlator 20. Such a window is shown in FIG. 2c.

The correlation function produced at the output of correlator 20 is given by:

$$\phi_I(t) = \phi_C * \phi_R + \phi_N + \phi_U \quad (7)$$

where:

$\phi_I(t)$ is the autocorrelation of $I$ window, $\phi_C$ is the autocorrelation of distorted shot pulse, $\phi_R$ is the autocorrelation of $R$ window, $\phi_N$ is the autocorrelation of $N$ window, and $\phi_U$ is the autocorrelation of $U$ window Since it can be assumed that the reflectivity $R(t)$, the coherent noise $N(t)$, and the random noise $U(t)$ are uncorrelated, the cross-correlation terms in $\phi_I(t)$ are zero. Further, it can be assumed that $R(t)$ and $U(t)$ have covariances $\psi_R$ and $\psi_U$, respectively, as follows:

$$\psi_R = \sigma^2_R \sigma(t) \quad (8)$$

$$\psi_U = \sigma^2_U \sigma(t) \quad (9)$$

where:

$\sigma^2_R$ and $\sigma^2_U$ are constants, and $\sigma(t)$ is a unit impulse

Therefore, the autocorrelation functions $\phi_R$ and $\phi_U$ are estimates of the true correlation functions which are assumed to be impulses with weights $\sigma^2_R$ and $\sigma^2_U$, respectively.

Further, if the coherent noise is low, $\phi_N \cong 0$ and equation (7) becomes: $\phi_I(t) = \phi_C * \phi_R + \phi_U \quad (10)$ The next step is to separate $\phi_C$ from the other components of $\phi_I(t)$ by using prior knowledge about the spectral differences between the components. The distorted shot pulse $\phi_C$ differs from the other two components $\phi_R$ and $\phi_U$ in that both of the latter have the characteristics of white noise. The spectrum of the distorted shot pulse is inherently smooth in contrast to the ragged spectral variations due to the reflectivity $R$ and noise $U$. In accordance with an important feature of this invention, the spectral variations due to reflectivity and noise are removed from the spectrum of $\phi_I(t)$ by multiplying $\phi_I(t)$ with a truncating function which will be referred to as $M(t)$. This smoothing can be performed by multiplying $\phi_I(t)$ by the truncating function in the multiplier 21. The choice of the truncating function which is to be used for smoothing is critical. It must have a spectrum which is non-negative to insure that the spectrum of the product is non-negative.

Figure 2B:
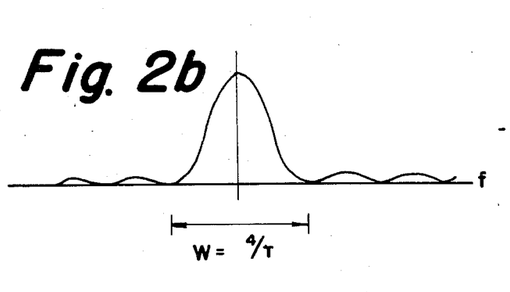
Figure 2C:
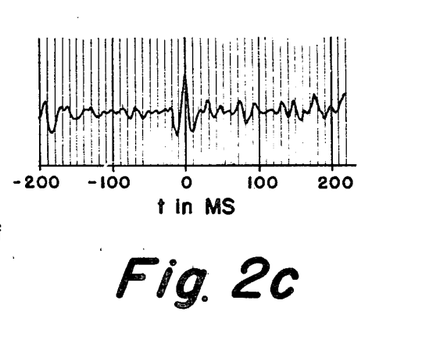
FIG. 2c shows a window of a seismic trace.

One truncator which is particularly suitable for this purpose is the triangular truncator shown in the time domain in FIG. 2a and in the frequency domain in FIG. 2b. The triangular truncator has a width T which is generally less than the width $T_W$ of the window of the seismic trace. Any truncator that has a non-negative spectrum is suitable. Another example is the Parzen truncator. This truncator is described on page 176 of Technometrics, Vol. 3, No. 2, May 1961, equation (5.10).

The truncator is applied coincidentally in time with the autocorrelation function which is at the output of autocorrelator 20. As shown, the truncator is obtained from storage on a track 22a of drum 16.

The truncated correlation function at the output of multiplier 21 is a good estimate of $\phi_C$, the autocorrelation of the distorted shot pulse. The autocorrelation estimate $\phi_C$ provides a good estimate of the amplitude spectrum of the distorted shot pulse $C(t)$ but the phase spectrum is lost. However, if the assumption is made that $C(t)$ is a minimum phase function, then the phase spectrum is uniquely defined by the amplitude spectrum. Therefore, it can be assumed that output of multiplier 21 characterizes the distortion.

Having thus characterized the distortion operator, the next step is to obtain the inverse of the distortion operator. Good techniques have been devised for obtaining the inverse filter of a known function.

The function of finding the inverse of the distortion operator can be implemented with either digital or analog techniques, both of which will be described in more detail subsequently. For the present, it is sufficient to state that the inverse operator selector 22 will produce as an output the filter coefficients which when applied to a time domain filter will produce filtering which is the inverse of the distortion operator. Thus, there has been obtained an estimate of the inverse of the distorted shot pulse without prior knowledge of the waveform of the distorted shot pulse.

The next step is the processing of the seismic trace to produce the desired signal estimate $\hat{S}$. First, the seismic trace $I(t)$ is filtered in the inverse filter 23. This filter, for example, may be of the time domain type such as is disclosed in the aforementioned Lawrence patent. The coefficients from inverse operator selector 22 are applied to the inverse filter 23 so that the seismic trace is convolved, or filtered, with this inverse filter. The output of inverse filter 23 is given by:

$$S = I(t) * F(t) \qquad (11)$$

As previously mentioned, the seismic trace $I(t)$ is the distorted shot pulse convolved with the reflectivity of the earth, plus noise. Making this substitution in equation (11), there is obtained:

$$S = [C(t) * R(t) + N + U] * F(t) \qquad (12)$$

or $$S = C(t) * R(t) * F(t) + (N + U) * F(t) \qquad (13)$$

Now, since $F(t)$ is the approximate inverse of the distorted shot pulse $C(t)$, the convolution of these two is approximately a unit impulse. Further, the assumption will be made that $N$ and $U$, the noise, are both small. Therefore, equation (13) becomes: $S \cong R(t)$ (14)

As the final step in the processing, the output of the inverse filter 23 is filtered by the D filter 24. The D filter is used to restrict the band width of the output because $F(t)$ is not a good estimate of the inverse of the distorted shot pulse at the low and high frequencies. The P filter also reinserts the effect of a shot pulse into the seismic data so that the output is the desired signal which would be produced by the desired shot pulse $D(t)$ filtered by the reflectivity of the earth. The output of D filter 24 is given by:

$$\hat{S} \cong D(t) * R(t) \qquad (15)$$

Thus, the process of this invention has produced a broad band flat signal spectrum in the seismic band without the presence of distortion.

It will be appreciated that all the functions shown in block form in FIG. 2 can be implemented with either digital or analog techniques. All of the blocks shown in FIG. 2 are well known analog circuits with the exception of the inverse operator selector 22 which will be described in detail subsequently. A digital routine for performing the processing in accordance with this invention will now be given in sufficient detail to enable those skilled in the art to carry it out. This routine is written in FORTRAN language and the program can be carried out by a number of suitable digital processing systems. As one example of a digital system on which this program has been performed, reference is made to the Control Data Corporation Computer 1604. The program is as follows:

```
 20 READ (4) NRL4
 25 READ (4) DUM
 30 READ (3) NRL3
 35 READ (3) DUM
 70 READ 75, JSTRT, JSTP, NSO, KTNC, LDT, NRCASE
 75 FORMAT (6I10)
 86 IF(KTNC)89, 87, 89
 87 AA=1.0
 88 GO TO 90
 89 AA=0.0
 90 CALL IDIN(4)
 95 IF (IA(2))100,725,100
100 CALL IDFLAG
105 NS4=IDR(5)
110 INT=IDR(6)
115 IDR(2)=NRL3
120 CALL IDOUT(3)
145 CALL TRIN(4,NS4)
147 IF(IA(2))150,705,150
150 KG=LDT/INT
155 DO 160 J=1,NS4,KG
160 S(J/KG+1)=S(J)
165 NG=NS4/KG
170 KZ=JSTRT/KG
175 KY=JSTP/KG
180 NFK=KY−KZ
185 DO 210 N=1,NSO
190 TEMP=0.0
195 NFZ=NFK−N+1
200 DO 205 J=1,NFZ
205 TEMP=TEMP+S(J)*S(J+N−1)
210 A(N)=TEMP
230 DELT=(FLOATF(LDT))/1000.0
355 CALL TRUNC(G,NG,NRCASE,AA)
505 CALL OPT(A,NSO,B)
620 CALL SINC(S,50,20.0,25.0,68.0,73.0, DELT,2)
625 CALL FLPR(S,50)
630 CALL FILTl(S,99,B,NSO,A,NSFD)
635 BACKSPACE 4
655 CALL TRIN(4,NS4)
657 DO 658 J=1,NS4,KG
658 S(J/KG+1)=S(J)
660 CALL FILTl(S,NS4/KG,A,NSFD,CL,NKF)
661 DO 665 J=1,NKF
665 CL (J)=CL(J+48)
670 CALL SCATTER(CL,NS4/KG,KG,S)
675 CALL TRMR(S,2046.0,1,NS4)
680 CALL TROUT (3,NS4)
702 GO TO 145
705 END FILE 3
715 GO TO 90
725 END FILE 3
730 REWIND 3
735 REWIND 4
END

SUBROUTINE SCATTER (A,NSA,INT,B)

5 DIMENSION A(1),B(1)
10 KK=INT*NSA
12 DB=INT
15 DO 20 J=1,KK
20 B(J)=0.0
22 K=INT−1
25 DO 30 J=1,NSA
30 B(J*INT−K)=A(J)
35 KB=NSA−1
37 NCTR=0
40 DO 60 M=2,NSA
```

```
42 NCTR=NCTR+1
45 AF=(A(M)-A(M-1))/DB
46 AJ=0.0
50 DO 60 J=1,K
51 AJ=AJ+AF
55 NCTR=NCTR+1
60 B(NCTR)=A(M-)+AJ
65 AF=A(NSA)/(FLOATF(K))
70 NCTR=NCTR+1
71 AJ=0.0
75 DO 85 J=1,K
76 AJ=AJ+AF
80 NCTR=NCTR+1
85 B(NCTR)=A(NSA)-AJ
90 RETURN
95 END
```

SUBROUTINEOPT(A,NN,E)

DIMENSION A(1),C(76,76),U(100,2),E(1)

```
M=NN/2
N=2*M
M1=M+1
DO 85 K=1,2
DO 75 I=1,M
DO 75 J=1,I
IJ=XABSF(I-J)
NIJ=XABSF(N+1-I-J)
C(I,J)=A(IJ+1)-(-1.)**K*A(NIJ+1)
75 C(J,I)=C(I,J)
C(1,M1)=1.
DO 80 I=2,M
80 C(I,M1)=CALL GAUSS (C,M)
```

SUBROUTINE GAUSS (C,M)

DIMENSION C(76,76)

```
10 DO 80 J=1,M
J1=J+1
M1=M+1
20 G=1./C(J,J)
30 DO 40 K=J1,M1
40 C(J,K)=G*C(J,K)
50 DO 80 K=J1,M
60 G=C(K,J)
70 DO 80 L=J1,M1
80 C(K,L)=C(K,L)-G*C(J,L)
```

C BACK SOLUTION

```
90 DO 150 J=1,M
95 J1=J+1
100 MJ=M+1-J
110 DO 150 K=J1,M
120 MK=M+1-K
140 G=C(MK,MJ)
150 C(MK,M+1)=C(MK,M+1)-G*C(MJ,M+1)
```

RETURN

END

```
DO 85 I=1,M
85 U(I,K)=C(I,M1)
DO 90 I=1,M
NI=M+1-I
E(I)=.5*(U(I,1)+U(I,2))
90 E(I+M)=.5*(U(NI,1)-U(NI,2))
```

RETURN

END

The more significant portions of the foregoing program will now be described sequentially.

Instructions 20, 25, 30 and 35 initiate the reading of magnetic tapes, in this case tapes 3 and 4, to insert the seismic traces I($t$) into the computer. Instruction 70 initiates the reading of certain parameters which have a format defined by Instruction 75. These parameters are JSTRT, the first sample in the window; JSTP, the last sample in the window; NSO, the number of samples in the correlation function; KTNC, selects the value of parameter AA which is dependent upon the type of truncator used; LDT, sampling interval to be used in correlation; and NRCASE, which selects the type of truncator.

Instructions 86, 87, 88 and 89 set the parameter AA that depends on the type truncator selected and is used in Subroutine TRUNC. For example, AA is set equal to 1.0 if Instruction 87 is used, or at 0.0 if Instruction 89 is used.

Instruction 105 specifies the number of samples per trace, and Instruction 110 specifies the sampling interval of the input trace. The Instructions 145 and 147 call for the reading-in of the input trace to be processed and, after processing this trace, for the continuation of the read-in of further input traces until all have been processed.

Instructions 150, 155 and 160 are used to decimate the input array. That is, the number of samples in the input seismic trace is decreased by increasing the sampling interval. This is done to reduce subsequent computing time. Care must be exercised to insure that decimation does not affect the process. As an example, the seismic data shown in FIG. 2c has a sampling interval of 1 millisecond and it is desired for the computer to use data having a 4-millisecond sampling interval. These instructions specify that the desired sampling interval KG, which is 4 milliseconds, is equal to LDT, which is 4 milliseconds, divided by INT, the sampling interval of the input array which is 1 millisecond.

Instructions 165, 170, 175 and 180 select the window from the decimated trace.

Instructions 185, 190, 195, 200, 205 and 210 make up an indexing loop, sometimes referred to as a DO LOOP, which autocorrelates the seismic window.

Instruction 355 calls subroutine TRUNC which truncates the autocorrelation function to achieve spectral smoothing and the separation of the distorted shot pulse from the autocorrelation function. A variety of truncators, including triangular and Parzen truncators, are available under control of NRCASE.

Instruction 505 calls up subroutine OPT which is a subroutine for determining the inverse filter of the distortion operator characterized by the distorted shot pulse which has previously been obtained. The inverse operator F is in the B array. This subroutine is repeated in its entirety at the end of the main program. The details of the subroutine OPT will be better understood from the detailed description of the inverse operator selector which will subsequently be given.

Figure 2D:
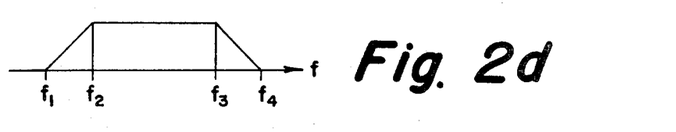
FIG. 2d shows the characteristics of a typical D filter.

Instruction 620 calls up a subroutine which generates the D filter operator. This instruction specifies the number of points NS, in this case 50, in the output array S. It also specifies the characteristics of the D filter. The amplitude spectrum of one suitable D filter, which is shown in FIG. 2d, has trapezoidal-shaped spectrum. As specified by the instructions, $f_1$ is 20.0 cycles per second; $f_2$ is 25.0 cycles per second; $f_3$ is 68.0 cycles per second; and $f_4$ is 73.0 cycles per second. Finally, DELT gives the time sampling interval, and 2 specifies the type of filter, in this case a trapezoidal band-pass filter.

Instruction 625 folds the input array just generated about the origin to generate an even function having 2*NS−1 samples, in this case 99.

Instruction 630 calls up a subroutine which convolves the F filter, the inverse filter generated by subroutine OPT with the D filter. Instruction 630 specifies that the input array S (D filter) has 99 points; the input array B (F filter) has a number of sampling points specified by NSO; and the output array A has a number of points specified by NSFD. It should be noted that in this program the D filter is convolved with the F filter before the convolution with the input seismic trace $I(t)$, whereas in FIG. 2 it is indicated that the F filter is convolved with the seismic trace first. It will be appreciated that the order in which the filters are convolved does not affect the final output.

Next, Instructions 635 and 655 recall the data trace $I(t)$ so that it can be convolved with the F*D filter. Instructions 657 and 658 are a DO LOOP that again decimates the data trace to give the same sampling interval as the F*D filter. Instruction 660 convolves the input trace $I(t)$ with the F*D filter. Instructions 661 and 665 are a DO LOOP that shifts the processed trace to preserve correct timing of the processed trace with respect to the data trace.

Instruction 670 calls up a subroutine which converts the filtered seismic trace back to a trace with the proper sampling intervals. Instruction 675 normalizes the trace for output and Instruction 680 writes out the trace on magnetic tape. Instructions 702 to 715 repeat the program for all of the seismic traces stored on the magnetic tapes which are being processed. Finally, Instructions 730 and 735 rewind the tapes and the processing of the data on these tapes is complete.

There will now be described in more detail the manner in which the inverse filter is determined and the manner in which the inverse filter is applied to the seismic data. These are the functions of the inverse operator selector 22 and the inverse filter 23 in FIG. 2. It will be understood that the manner of determining the inverse operator in the time domain is the invention of Manus R. Foster as more fully disclosed in U.S. Pat. No. 3,275,980. The digital routine for determining this inverse operator has been designated OPTISEPOP which is an anacronym for Optimum Separation Operator.

In order to complete the disclosure of the present invention, the determination of the inverse operator by both analog and digital technique is described below.

In order to disclose the manner in which the inverse filter is determined either for digital or analog processing, it will be desirable now to present a discussion of background theory. It is withing the scope of the present invention to obtain the inverse function by using a digital computer, an electrical or magnetic delay line, or a time domain filter. That these various approaches are suitable will be evident from the following.

Consider the seismic trace window shown in FIG. 2c. As is common, this seismic trace can be sampled at short intervals so that the seismic trace can be represented by these samples. Just as an example, the 400 millisecond wide window in FIG. 2c might be sampled at 1 millisecond intervals. The window of the seismic trace can be represented by a series of samples, each representing the amplitude of the seismic trace at successive time intervals.

The distortion operator may be represented by a series of coefficients, one for each sampling interval. These coefficients may be denoted $C_j$, when $j$ is an integer.

The general expression for a distortion operation on seismic data $s_i$ is:

$$S_i = \sum_{j=-\infty}^{+\infty} C_j s_{i-j} \qquad (16)$$

This expression states that data $s_{i-j}$ has been distorted by a distortion operator whose coefficients are $C_j$ to produce distorted seismic data $S_i$. An inverse filter is to be derived to approximately convert the distortion operator to a unit impulse.

The exact inverse filter for the expression of equation (16) can be derived by satisfying the following conditions:

$$s_i = \sum_{j=-\infty}^{+\infty} a_j S_{i-j} \qquad (17)$$

where:

$a_j$ represents the coefficients of the inverse filter

However, if the exact inverse filter as defined by equation (17) is applied to actual data, the results leave much to be desired. This is by reason of the amplification by the filter of noise which is present. This noise completely dominates the output from the inverse filter. This noise is present partly because the inverse filter operates upon finite data and the filter itself possesses an infinite memory length. This effect, called truncation, will render useless any data which is produced from the filter. Therefore, another filter must be evolved which is an optimum filter of finite memory length. Such a filter will minimize the effect of noise.

In order to do this, the actual data on the seismic trace may be defined as:

$$S_i' = S_i + N_i \qquad (18)$$

where:

$S_i'$ is the actual seismic data, and $N_i$ is the error due to various types of noise Since the error introduced by the noise cannot be completely eliminated, the inverse operator must be designed to give as good an estimate of the actual data $s_i$ as is possible. The estimate will be referred to as $\hat{s}_i$. The result of filtering the data $S_i'$ with the optimum inverse operator can be denoted:

$$\hat{s}_i = \sum_{j=0}^{K-1} a_j (S'_{i-j}) \qquad (19)$$

where:

$K$ is the memory length of the inverse filter which may be further defined as the total number of coefficients comprising the filter In order to select the proper coefficients for the inverse filter and thus to optimize the filter, there is employed the Wiener criterion. Briefly stated, the Wiener criterion is the minimization of the mean square error that may exist as between any true value of data $s_i$ and the estimated data $\hat{s}_i$ which will be produced by the filter. The Wiener criterion is discussed more fully in the book by Y. W. Lee, previously referenced herein. The Wiener criterion may be expressed as:

$$E = <(s_i-\hat{s}_i)^2 + (s_{i+1}-\hat{s}_{i+1})^2 + (s_{i+2}-\hat{s}_{i+2})^2 \ldots >_{av} = \text{minimum} \quad (20)$$

or $$E = <\Sigma(s_i-\hat{s}_i)^2>_{av} = \text{minimum} \quad (21)$$

The filter is thus optimized by optimizing the prediction error, that is to say, by minimizing the value of the error $E$.

It can be shown mathematically that from this process an expression of an optimum inverse filter may be derived and one which, in accordance with the present invention, is expressed as:

$$\sum_{k=0}^{K-1} A_{jk} a_k = \delta_j \quad (22)$$

where:
$A_{jk}$ are coefficients,
$\sigma_j = 1$ for $j=0$, and
$\sigma_j = 0$ for all other $j$'s Any multiple of $A_{jk}$ and a non-zero constant will produce a filter which is suitable for the purposes of this invention.

The coefficients or values for $A_{jk}$ are determined from the truncated autocorrelation function of the seismic window. The relationship between the coefficient $A_{jk}$ and the output of multiplier 21, $M\phi_I$, is given by:

$$A_{jk} = M\phi_I((j-k)\Delta t) \quad (23)$$

where:
$\Delta t$ is the sampling interval

Figure 3:
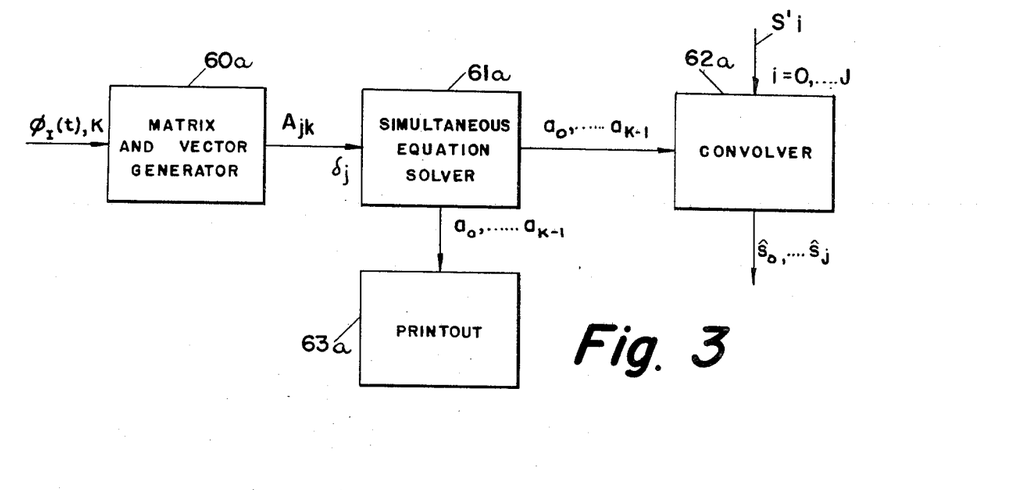
FIG. 3 is a block representation of the determination of the inverse operator and the convolution of the data with this inverse operator.

There is now available all the information necessary for carrying out the methods of the present invention. In FIG. 3, there is illustrated in block schematic form a complete system for solution of the coefficients of the inverse filter and for convolving the determined inverse filter with the data $S_i'$.

In FIG. 3, the matrix and vector generator 60a and the simultaneous equation solver 61a form a part of the inverse operator selector 22 of FIG. 2, while the convolver 62a corresponds with the inverse filter 23 in FIG. 2.

The initial coefficients $A_{jk}$ are determined by way of a properly programmed digital computer which solves the relationships set forth in equation (23). On the other hand, simple analog computers are available for carrying out this solution. Indeed, the relationships are so simple as to be performed directly by an operator.

The values of $A_{jk}$ are now applied to the solution of equation (22). The equation may be solved in a computer by suitable programming if it be a digital computer. On the other hand, equation (22) may be placed in matrix form and then expressed as a series of simultaneous equations to be solved by an analog arrangement as hereinafter described.

Figure 4:
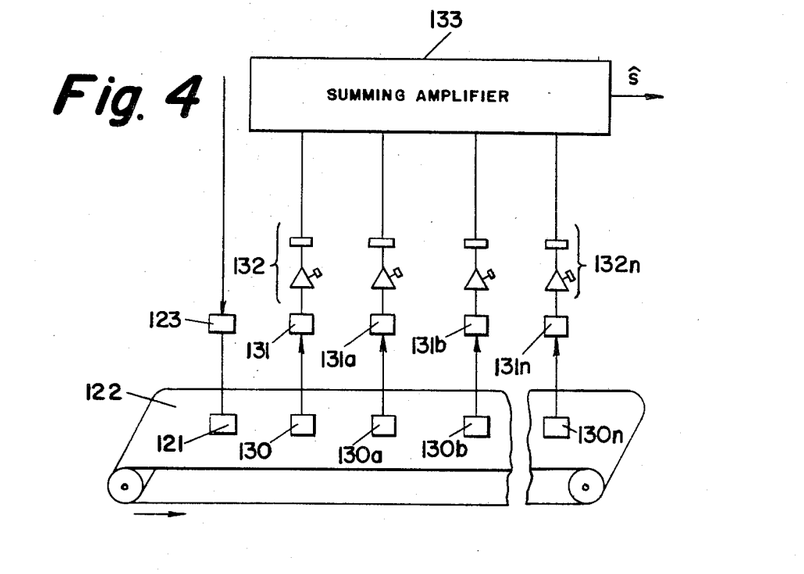
FIG. 4 shows an analog implementation of a time domain filter or convolver.

The coefficients or values of the inverse filter $a_0 \ldots a_{K-1}$ are now applied to a convolver 62a and, if desired, these values may be recorded on a suitable printout mechanism 63a for future reference or to be employed in the determination of the amplifier gains and polarities of the outputs of the various heads that will comprise the inverse filter if it is in the analog form as represented in FIG. 4.

The information $S_i'$, representing seismic data, is now applied to the convolver 62a which solves equation (19) and produces an output signal $s_0 \ldots s_j \ldots$ representative of the data.

There will now be assigned to the various functions involved in the solution certain values in order to review the operation again, but in greater detail.

It will immediately be seen from examination of the various formulas that to write down the values of $A_{jk}$ for the conditions set forth above would be beyond the scope of this description and would needlessly burden it. However, in order to provide a more complete understanding of the solution of the various equations, there will be assigned values significantly smaller and to be considered only as exemplary of the operation of the formulas and are not necessarily suggested for use in the working embodiment of the invention or in the practice of the method thereof. With this understanding in mind, assume that $K=4$. With the limits set for $k$ to extend from 0 to 3, the following table of values is assumed to be determined for $A_{jk}$ by solution of equation (23).

TABLE A

| | | | |
|---|---|---|---|
| $A_{0,0}=40.6$ | $A_{1,0}=0.25$ | $A_{2,0}=0$ | $A_{3,0}=0$ |
| $A_{0,1}=0.25$ | $A_{1,1}=0.6$ | $A_{2,1}=0.25$ | $A_{3,1}=0$ |
| $A_{0,2}=0$ | $A_{1,2}=0.25$ | $A_{2,2}=0.6$ | $A_{3,2}=0.25$ |
| $A_{0,3}=0$ | $A_{1,3}=0$ | $A_{2,3}=0.25$ | $A_{3,3}=0.6$ |

With the coefficients $A_{jk}$ available, they are fed to the simultaneous equation solver 61a for generation of signals representative of the coefficients of the inverse filter. As stated above, there are many ways of solving these equations, including analog systems. One form of analog system is of the type shown in FIG. 5. For convenience, we may write equation (22) in matrix form and obtain the following:

$$(A_{jk}) \quad (a_k) \quad \delta_j$$

$$\begin{bmatrix} A_{0,0}, A_{0,1}, A_{0,2}, \ldots A_{0,K-1} \\ A_{1,0}, A_{1,1}, A_{1,2}, \ldots A_{1,K-1} \\ A_{2,0}, A_{2,1}, A_{2,2}, \ldots A_{2,K-1} \\ \vdots \\ A_{K-1,0}, A_{K-1,1}, A_{K-1,2}, \ldots A_{K-1,K-1} \end{bmatrix} \begin{bmatrix} a_0 \\ a_1 \\ a_2 \\ \vdots \\ a_{K-1} \end{bmatrix} = \begin{bmatrix} 1 \\ 0 \\ 1 \\ \vdots \\ 0 \end{bmatrix}$$

Now, by substituting the previously determined values of $A_{jk}$ into the matrix of equation (22), there is obtained:

$$A_{jk} \quad a_k \quad \delta_j$$

$$(24) \begin{bmatrix} 0.6 & 0.25 & 0 & 0 \\ 0.25 & 0.6 & 0.25 & 0 \\ 0 & 0.25 & 0.6 & 0.25 \\ 0 & 0 & 0.25 & 0.6 \end{bmatrix} \begin{bmatrix} a_0 \\ a_1 \\ a_2 \\ a_3 \end{bmatrix} = \begin{bmatrix} 1 \\ 0 \\ 0 \\ 0 \end{bmatrix}$$

Figure 5:
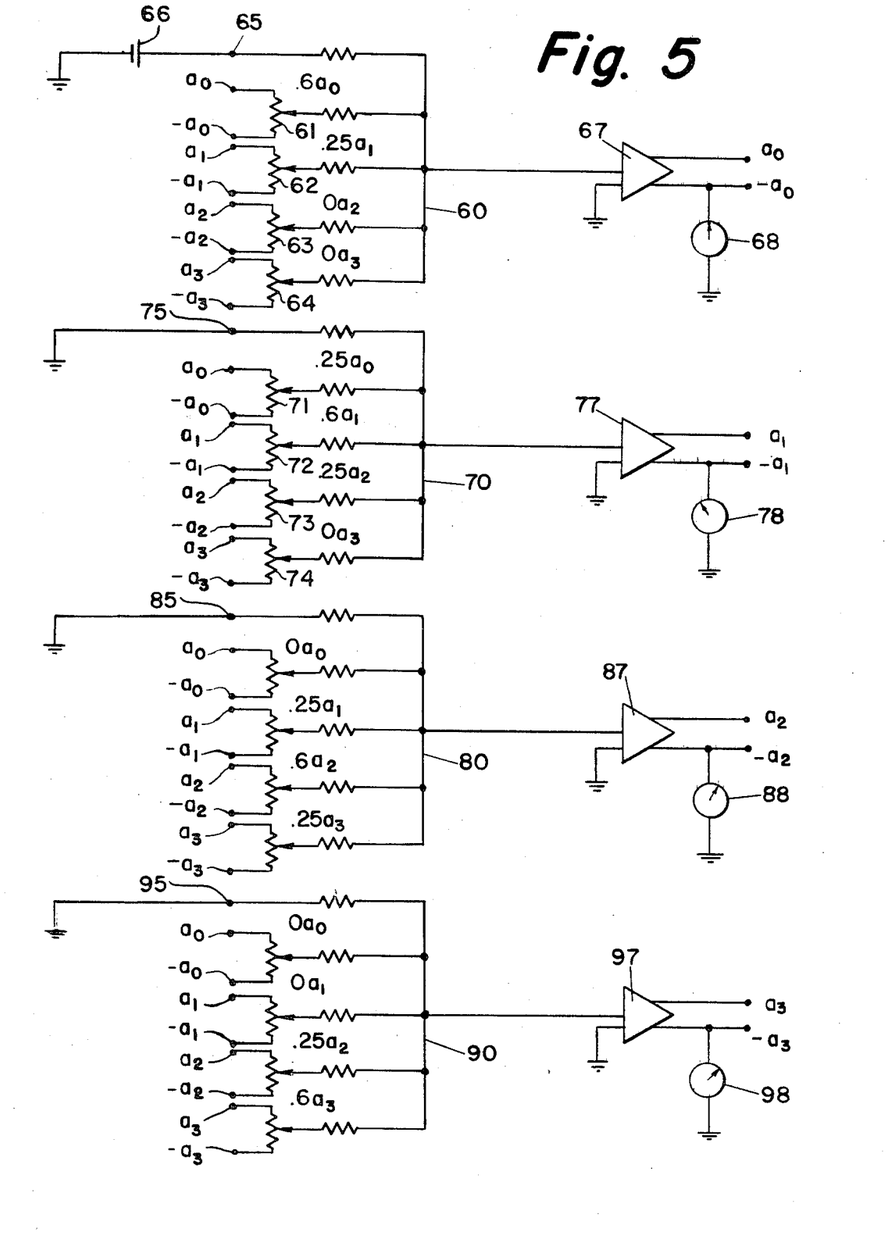
FIG. 5 shows an analog computer for solving simultaneous equations.

From the matrix set up in equation (24), there may be derived the following simultaneous equations to be solved by the analog computer of FIG. 5:

$$0.6\,a_0 + 0.25\,a_1 + 0\,a_2 + 0a_3 = 1$$
$$0.25\,a_0 + 0.6\,a_1 + 0.25\,a_2 + 0a_3 = 0 \rbrace \text{ TM (25)}$$
$$0a_0 + 0.25\,a_1 + 0.6\,a_2 + 0.25\,a_3 = 0$$
$$0\,a_0 + 0\,a_1 + 0.25\,a_2 + 0.6\,a_3 = 0$$

The analog computer of FIG. 5 is one of many available in the art and is of the type disclosed at pages 64, 65 of Electronic Analog Computers, by Korn and Korn, McGraw-Hill, 1946, Second Edition. In this form of simultaneous equation solver, there are provided a number of networks 60, 70, 80 and 90, equal in number to the number of points to be employed in defining the inverse filter. Likewise, in each of the networks, taking network 60 as exemplary, there are included potentiometers 61, 62, 63 and 64, again equal in number to the number of points defining the inverse filter. In practice, the inverse filter will be defined by approximately one hundred twenty points, and, accordingly, there would be required in a practical embodiment 120 of the networks, each including 120 of the potentiometers. It is now evident why a more simple example was chosen for purpose of this description. Each of the terminals 65, 75, 85 and 95 of the networks is respectively connected to a source of potential whose amplitude represents the values of $\sigma_j$. Thus, the network 60, associated with the first equation of equation (25), will have its terminal 65 connected to a battery 66 having a potential which represents a value of 1. Each of its potentiometers 61, 62, 63 and 64 will be set respectively with the coefficients $A_{jk}$, which values are taken from the coefficients of the first equation. Accordingly, potentiometer 61 will be set for a value of 0.6; potentiometer 62 will be set for a value of 0.25; and potentiometers 63 and 64 will be set for values of 0. Each of the potentiometers will have applied to it two potentials of equal magnitude but opposite polarity and each representative in the balanced condition of the networks of a value of the inverse filter. Thus, by setting each of the potentiometers, we can either obtain, by placing the movable contact at one extreme, the full positive value of the inverse filter amplitude or the full negative value. With the potentiometer set at a midposition, a zero potential will be selected corresponding to an $A_{jk}$ value of 0.

The terminal 75 of network 70 which is associated with the second equation of equation (25) will be connected to ground, representing a $\sigma_j$ value of 0; and each of the contacts of the potentiometers 71, 72, 73 and 74 will be set in accordance with the $A_{jk}$ coefficient values set forth in the second equation.

The terminal 85 of network 80 will be connected to ground representing a $\sigma_j$ value of 0 in the third equation of equation (25).

The terminal 95 of network 90 will also be connected to ground corresponding with the value of $\sigma_j$ in the fourth equation of equation (25). The outputs of each of the networks 60, 70, 80 and 90, respectively, are applied to DC amplifiers 67, 77, 87 and 97. Recording voltmeters which may be of the digital or analog variety are connected to the outputs of the amplifiers 67, 77, 87 and 97 to record the values of the $a_k$ functions defining the inverse filter when the networks come to balance. From direct readings of these voltmeters 68, 78, 88 and 98, there will be obtained the values defining the inverse filter; and these values will be applied to the input of the convolver 62a of FIG. 3 and will define an inverse filter whose impulse response will be the inverse of the distortion operator which has been considered in this description as the distortion introduced into the seismic data $S_i$. Similarly, this information may be employed as hereinafter described in determining an inverse filter for an analog system as shown in FIG. 4.

Now that there has been fully described the technique employed in deriving the desired characteristic of the inverse filter, there will now be described an analog form of the inverse filter 23.

The analog arrangement of FIG. 4 is disclosed, for example, in copending application Ser. No. 284,064, filed May 29, 1963, by Jack T. Nipper, a coworker of mine, and assigned to the same assignee.

There is shown in FIG. 4 a magnetic recording system including a recording head 121 and a magnetic belt 122. The seismic data $I(t)$ is applied by way of amplifier 123 to the recording head 121 which records the seismic data to be filtered on the magnetic tape 122.

As the tape moves, it carries the recorded information toward the pickup heads 130, 130a, 130b and 130n. The number of pickup heads will be determined by the number of points defining the inverse filter or inverse operator. Time domain filters are now available on the market with at least one hundred pickup heads and would be suitable for use in the system of the present invention. Each of the pickup heads 130–130n is respectively connected to FM demodulators 131–131n and, in turn, to amplitude- and polarity-determining devices 132–132n. Each of these devices will include an amplifier and a polarity-reversing switch with the amplifiers being of variable gain to establish the amplitudes of each of the points defining the inverse operator and the polarity switch establishing whether the signal is positive or negative. For further details concerning the amplitude-weighing and the polarity-reversing arrangement, reference may be had to U.S. Pat. No. 3,076,172 of Lawrence and Foster, issued on Jan. 29, 1963, and, more particularly, to FIG. 9 thereof.

With the inverse filter properly defined by adjustment of the devices 132–132n, the input signal $I(t)$ is now convolved by the filter comprising the pickup heads 130–130n, and the outputs of the devices 132–132n are applied to a summing network or amplifier 133. The sum signal which represents $\hat{S}$ may be applied to a suitable recorder for permanent recording of the distortion-free seismic data.

Figure 6:
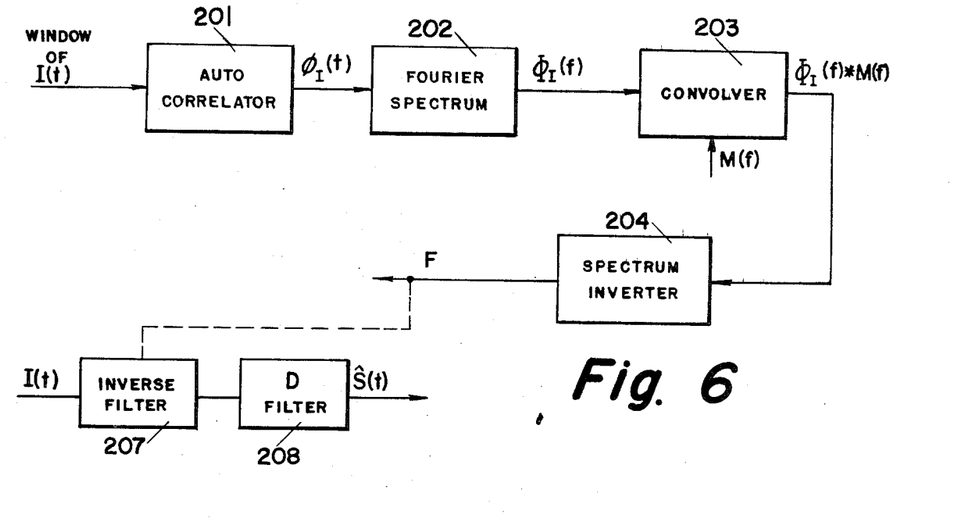
FIG. 6 shows a block diagram of a frequency domain implementation of the invention.

Frequency Domain Processing — There will now be described the frequency domain implementation of the processing in accordance with this invention. What has been previously described is the time domain processing of information. The block diagram of the frequency domain processor is shown in FIG. 6.

As was described in conjunction with FIG. 2, a portion, or window, of the seismic trace $I(t)$ is selected. The energy spectrum of this window is the frequency domain transform of equation (7) and is given by:

$$\Phi_I = \Phi_C \cdot \Phi_R + \Phi_N + \Phi_U \quad (26)$$

where $\Phi_I$ is the energy spectrum of $I$ window $\Phi_C$ is the energy spectrum of distorted shot pulse $\Phi_R$ is the energy spectrum of $R$ component in $I$ window $\Phi_N$ is the energy spectrum of $N$ component in $I$ window, and $\Phi_U$ is the energy spectrum of $U$ component in $I$ window The spectral components $\Phi_R$ and $\Phi_U$ are estimates of the true power spectra of the white noise processes $R(t)$ and $U(t)$ which are assumed to be constant for all frequencies with values $\sigma_R^2$ and $\sigma_U^2$, respectively. If the coherent noise is low, $\Phi_N \cong 0$ and (26) becomes:

$$\Phi_I = \Phi_C \cdot \Phi_R + \Phi_U \qquad (27)$$

The output of autocorrelator 201 is applied to a Fourier spectrum analyzer 202. This Fourier spectrum analysis provides an output indicative of the spectrum of the autocorrelation function. This Fourier analysis is carried out in accordance with well known techniques such as described in the previously mentioned book by Y. W. Lee.

Figure 6A:
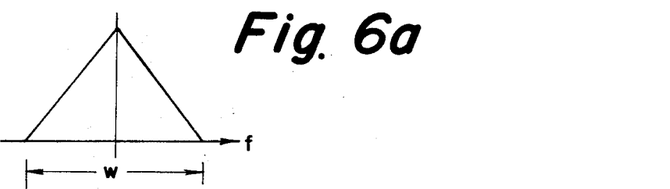
FIG. 6a shows, in the frequency domain, a truncator suitable for use with the system of FIG. 6.
Figure 6B:
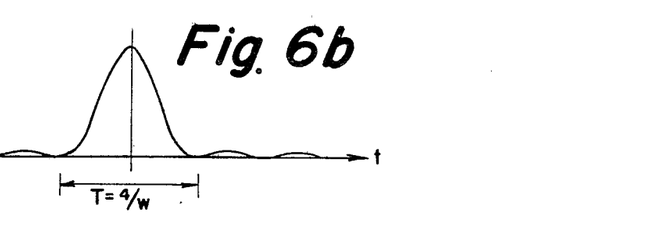
FIG. 6b shows the truncator of FIG. 6a in the time domain.

The spectrum of $\Phi_I$ is next smoothed to separate the distorted shot pulse from the white noise processes. The smoothing is accomplished by convolving $\Phi_I$ with a spectral smoother $M(f)$. This step corresponds to truncation of the autocorrelation in the time domain. The smoothed spectrum, which is the output of convolver 23, characterizes the distorted shot pulse $C(t)$. This convolution may be carried out by digital techniques or may be carried out in an analog manner as described in conjunction with FIG. 4. The smoothing function $M(f)$, which is convolved with $'_I(f)$ is the frequency domain equivalent of the truncator used to truncate $\phi_I(t)$ in the first embodiment of this invention. One of the many possible spectral smoothers to be applied to convolver 23 has a triangular shape in the frequency domain, as shown in FIG. 6a. The spectral smoother is shown in the time domain in FIG. 6b.

The smooth spectrum at the output of convolver 23 is applied to spectrum inverter 204. This inverter performs two functions. First, it inverts the energy spectrum of the shot pulse estimate; and, second, it provides as an output the minimum phase wavelet having that spectrum. This function can be particularly well implemented with techniques developed by A. Kolmogoroff and, more particularly, described in Ph.D. Thesis of E.A. Robinson, MIT, and Scientific Report No. 2 of Contract AF 19(604)7378.

The output of inverter 204 is an estimate of the minimum phase inverse of the distorted shot pulse $C(t)$. This inverse, $F$, is applied to an inverse filter 207 which filters the seismic data $I(t)$, as discussed previously in conjunction with FIG. 2. Again, the output of the inverse filter 27 is applied to a D filter 208, as was also previously discussed.

In some situations, it may be desirable to multiply the output of spectrum inverter 204 by a time domain truncator to force the inverse to decay smoothly to 0. This prevents error which might otherwise occur.

Summarizing the frequency domain implementation of this invention, the only essential difference between the time domain process shown in FIG. 2 and the frequency domain process shown in FIG. 6 is in the method of spectral smoothing before computing the inverse operator $F(t)$. In the time domain, the spectral smoothing is accomplished by multiplying the autocorrelation function with a truncator. In the frequency domain, the spectral smoothing is accomplished by convolving the spectrum of the autocorrelation function with a spectral smoother. In both instances, the purpose of this spectral smoothing is to remove the reflectivity and noise from the spectrum of the autocorrelation function so that the result characterizes the distorted shot pulse.

One suitable truncator which will produce a smooth termination of the inverse is the truncator commonly referred to as a Hamming truncator. This truncator is defined by:

$$HAM(t) = \begin{cases} 0.54 + 0.46 \cos \frac{\pi t}{T}, & |t| \leq T \\ 0, & |t| > T \end{cases} \qquad (28)$$

where: T is the length of F

There has now been described particular embodiments of the processing in accordance with this invention. It will be understood, of course, that various modifications can be made without departing from the principles of the invention. The appended claims are, therefore, intended to cover any such modifications within the true spirit and scope of the invention.

What is claimed is:

1. The method of processing electric signals representing geophysical data to compensate for the effect of distortion present in obtaining said geophysical data and to emphasize the characteristics of the geological formations producing said geophysical data which comprises the following steps each performed in an automatic system:

correlating said electric signals representing geophysical data to obtain an electric signal having a distortion component representing said distortion and having a reflectivity component representing said characteristics of said geological formations, modifying the spectrum of said signal, including smoothing the spectrum of said last-named electric signal, to ensure that the spectrum of the modified signal is non-negative and thereby separating said distortion component from said reflectivity component, inverting said distortion component to produce an inverse distortion filter, and applying said electric signals representing said geophysical data to said inverse distortion filter to produce an output emphasizing said characteristics of said geological formations.

2. The method recited in claim 1 further including the steps of:

selecting a portion of said electric signals representing said geophysical data, and correlating said potion of said electric signals representing said geophysical data to obtain said electric signal having said distortion component and said reflectivity component.

3. The method recited in claim 1 further including the step of:

applying said output of said inverse distortion filter to a further filter which has a broad flat signal spectrum in the seismic band thereby to produce a final output representing the geophysical data which would have been produced in the absence of said distortion.

4. The method of processing geophysical data to compensate for the effect of distortion present in said geophysical data and to emphasize the characteristics of the geological formations producing said geophysical data which comprises in an automatic digital processing system:

selecting a portion of said geophysical data in said system, correlating in said system said portion of said geophysical data to obtain a signal having a distortion component representing said distortion and having a reflectivity component representing said characteristics of said geological formations, truncating said signal to produce spectral smoothing thereby separating said distortion component from said reflectivity component, inverting in said system said distortion component to produce an inverse distortion operator, deriving from said inverse distortion operator an inverse filter, and applying said geophysical data to said inverse filter and to a filter which has a broad flat signal spectrum in the seismic band to produce an output emphasizing said characteristics of said geological formations.

5. The method of processing geophysical data to compensate for the effect of distortion present in obtaining said geophysical data and to emphasize the characteristics of the geological formations producing said geophysical data which comprises in an automatic processing system:

selecting in said system a portion of said geophysical data having a distortion component, producing a signal representing the energy spectrum of said selected geophysical data, convolving said energy spectrum with a smoothing function to produce a signal characterizing the distortion component, inverting in said system said distortion component to produce the inverse of said distortion component, and applying said inverse of said distortion component to said geophysical data to produce an output emphasizing said characteristics of said geological formations.

6. The method of characterizing distortion present in geophysical data representing the characteristics of geological formations which comprises the following steps each performed in an automatic processing system:

selecting a portion of said geophysical data, correlating said portion of said geophysical data to obtain a signal having a distortion component representing said distortion and having a reflectivity component representing said characteristics of said geological formations, and modifying the spectrum of said signal, including truncating said signal, to ensure that the spectrum of the modified signal is non-negative and to produce spectral smoothing thereby separating said distortion component from said reflectivity component.

7. The method of processing geophysical data to suppress distortion present in obtaining said data and to emphasize the characteristics of the geological formations producing said geophysical data which comprises in an automatic processing system:

selecting a portion of said geophysical data in said system, autocorrelating in said system said portion of said geophysical data to obtain a signal having a distortion component representing said distortion and having a reflectivity component representing said characteristics of said geological formations, multiplying in said system said signal by a triangular truncator to produce spectral smoothing in said signal thereby to suppress said reflectivity component and to produce an output characterizing said distortion component, determining in said system from said output the coefficients of an optimum, finite memory, inverse filter having characteristics which are the inverse of the distortion operator characterized by said output, deriving from said coefficients an inverse filter having filtering characteristics which are the inverse of said distortion operator, and applying said geophysical data to said inverse filter to produce an output emphasizing said characteristics of said geological formations.

8. The method of processing geophysical data to compensate for the effect of distortion present in said geophysical data and to emphasize the characteristics of the geological formations producing said geophysical data which comprises the following steps each performed in an automatic processing system:

selecting a portion of said geophysical data, correlating said potion of said geophysical data to obtain a signal having a distortion component representing said distortion and having a reflectivity component representing said characteristics of said geological formations, modifying said signal, including truncating said signal, to ensure that the spectrum of the modified signal is non-negative and to produce spectral smoothing thereby separating said distortion component from said reflectivity component, inverting in said system said distortion component to produce an inverse distortion operator, and convolving in said system said geophysical data and said operator to produce an output emphasizing said characteristics of said geological formations.

9. The method of processing geophysical data to emphasize the characteristics representing the geological formations producing said geophysical data which comprises in an automatic digital processing system:

generating from said geophysical data a signal in said system having separable components, smoothing in said system the spectrum of said signal to suppress at least one of said components, inverting in said system the smoothed signal to produce an inverse filter, and applying said geophysical data to said inverse filter and to a filter which has a broad flat signal spectrum in the seismic band to produce an output emphasizing said characteristics of said geological formations.

10. The method of processing geophysical data to emphasize the characteristics representing the geological formations producing said geophysical data which comprises in an automatic processing system:

generating a signal which can be characterized by the autocorrelation function of said geophysical data in said system, modifying the spectrum of said signal, including smoothing said spectrum, to ensure that the spectrum of the modified signal is non-negative, inverting in said system the modified signal to produce an inverse filter, and applying said geophysical data to said inverse filter to produce an output emphasizing said characteristics of said geological formations.

11. The method of processing geophysical data to compensate for the effect of distortion present in obtaining said geophysical data and to emphasize the characteristics representing the geological formations producing said geophysical data which comprises in an automatic digital processing system:

generating in said system from said geophysical data a signal representative of the power spectrum of said geophysical data, said signal having a distortion component representing said distortion and having a reflectivity component representing said characteristics of said geological formations, smoothing in said system the spectrum of said signal thereby separating said distortion component from said reflectivity component, inverting said distortion component to produce an inverse distortion filter, and applying said geophysical data to said inverse distortion filter and to a filter which has a broad flat signal spectrum in the seismic band to produce an output emphasizing said characteristics of said geological formations.

12. The method of characterizing distortion present in geophysical data representing the characteristics of geological formations which comprises the following steps each performed in an automatic processing system:

selecting a portion of said geophysical data, generating from said portion a signal having a distortion component representing said distortion and having a reflectivity component representing said characteristics of said geological formations, and modifying the spectrum of said signal, including smoothing said spectrum, to ensure that the spectrum of the modified signal is non-negative and to separate said distortion component from said reflectivity component.

13. In the processing of geophysical data to compensate for the effect of distortion present in obtaining said geophysical data and to emphasize the characteristics of the geological formations producing said geophysical data, the new use of digital computing apparatus, said computing apparatus being interconnected to include:

a correlator, a smoothing filter for smoothing the spectrum of the signal applied to the input, an inverter producing as an output coefficients of a filter which is the inverse of the signal applied to the input, an inverse filter, and a filter which has a broad flat signal spectrum in the seismic band, said new use comprising:

applying said geophysical data to said correlator to produce as an output a signal having a distortion component representing said distortion and a reflectivity component representing said characteristics of said geological formations, applying said last-named signal to said smoothing filter to smooth the spectrum of said signal thereby separating said distortion component from said reflectivity component, applying the output of said smoothing filter, representing said distortion component, to said inverter to produce as an output of said inverter the coefficients of a filter which is the inverse of said distortion component, applying said coefficients to said inverse filter to provide an inverse filter having filtering which is the inverse of the distortion operator, and applying said geophysical data to said inverse filter and to said filter having a broad flat signal spectrum to produce an output emphasizing said characteristics of said geological formations.

14. The new use recited in claim 13 wherein said smoothing filter includes a multiplier, and wherein said new use includes:

multiplying said geophysical data by a truncator to produce at the output of said multiplier a signal representing said distortion component.

15. The new use recited in claim 13 wherein said smoothing filter includes a convolver and said computing apparatus further includes a Fourier spectrum analyzer, said new use further including:

applying the output of said correlator to said Fourier spectrum analyzer to produce an output indicative of the spectrum of the correlation function, and applying said last-named output to said convolver for convolving said output with a smoothing function to produce at the output of said convolver a signal representing said distortion component.

16. Digital computing apparatus for processing seismograms to compensate for the effect of distortion present in obtaining said seismograms and to emphasize the characteristics of the geological formations producing said seismograms comprising:

means for converting said seismograms to electrical signals of the type which can be operated upon by said computing apparatus, a correlator, said electrical signals being applied to said correlator to produce as an output an electrical signal having a distortion component representing said distortion and a reflectivity component representing said characteristics of said geological formations, a smoothing filter for smoothing the spectrum of the signal applied to the input, the output of said correlator being applied to said smoothing filter to smooth said spectrum thereby producing an output representing said distortion component and suppressing said reflectivity component, an inverter producing as an output coefficients of a filter having characteristics which are the inverse of the signal applied to the input of said inverter, the output of said smoothing filter, representing said distortion component, being applied to said inverter to produce, as an output of said inverter, filter coefficients which are the inverse of said distortion component, an inverse filter, said filter coefficients being applied to said inverse filter so that said inverse filter has filtering characteristics which are the inverse of said distortion, a filter having a broad flat signal spectrum in the seismic band, and means for applying said seismograms to said inverse filter and to said filter having a broad flat signal spectrum to produce an output emphasizing said characteristics of said geological formations.

17. The apparatus recited in claim 16 wherein said smoothing filter includes a multiplier, said seismogram being applied to said multiplier for multiplication by a truncator to produce at the output of said multiplier a signal representing said distortion component.

* * * * *

UNITED STATES PATENT OFFICE
CERTIFICATE OF CORRECTION

Patent No. 3,689,874    Dated September 5, 1972

Inventor(s) Manus R. Foster, Clyde W. Kerns, and Raymond L. Sengbush

It is certified that error appears in the above-identified patent and that said Letters Patent are hereby corrected as shown below:

On the Title Page, in column 1 thereof, insert --Assignee: Mobil Oil Corporation--. Column 3, lines 59 and 62, "$\sigma(t)$" should read --$\delta(t)$--. Column 5, equation (5), that portion of the equation reading "B(f)" should read --B(t)--. Column 6, equations (8) and (9), that portion of the equations reading "$\sigma(t)$" should read --$\delta(t)$--; and line 12, "$\sigma(t)$" should read --$\delta(t)$--. Column 7, line 40, "P filter" should read --D filter--. Column 8, line 28, that portion of Instruction 200 reading "J—1" should read --J=1--. Column 9, line 7, that portion of Instruction 60 reading "(M—)" should read --(M-1)--. Column 9, line 33, cancel "80 C(I,M1)=CALL GAUSS(C,M)" and insert the following:

```
80 C(I,M1)=0.
   CALL GAUSS (C,M)
```

Column 9, line 65, "NI=M+—I" should read --NI=M+1-I--. Column 11, line 62, "withing" should read --within--. Column 12, line 12, "when" should read --where--. Column 12, equation (19), that portion of the equation reading "$s_i$" should read -- $\widehat{s}_i$ --.

Column 13, line 26 and line 27, "$\sigma_j$" should read --$\delta_j$--.

Column 14, line 33 (line 1 of column 1 of Table A), "$A_{0,0}$=A0.6" should read -- $A_{0,0}$=0.6 --. Column 14, lines 45 to 55, the last column of the table should read as follows:

(Cont. on p. 2)

UNITED STATES PATENT OFFICE
CERTIFICATE OF CORRECTION, contd.

Patent No. 3,689,874      Dated September 5, 1972

Inventor(s) Manus R. Foster, Clyde W. Kerns, and Raymond L. Sengbush

It is certified that error appears in the above-identified patent and that said Letters Patent are hereby corrected as shown below:

$$\delta_j \begin{bmatrix} 1 \\ 0 \\ 0 \\ \\ 0 \end{bmatrix}$$

Column 14, equation (24), the second column should read as follows:

$$a_k \begin{bmatrix} a_0 \\ a_1 \\ a_2 \\ a_3 \end{bmatrix}$$

Column 15, equation (25), the second line of this equation should read as follows:

$$0.25\ a_0 + 0.6\ a_1 + 0.25\ a_2 + 0\ a_3 = 0$$

Column 15, line 28, line 51, line 56, and line 59, "$\sigma_j$" should read -- $\delta_j$ --. Column 16, line 41, "U.S. Pat. No. 3,076,172" should read --U.S. Pat. No. 3,076,177--. Column 17, line 24, line 32, and line 35, "23" should read --203--; line 28, " $'_I(f)$ " should read -- $\phi_I(f)$ --; and line 51, "27" should read --207--.

(Cont. on p. 3)

UNITED STATES PATENT OFFICE
CERTIFICATE OF CORRECTION, contd.

Patent No. 3,689,874          Dated September 5, 1972

Inventor(s) Manus R. Foster, Clyde W. Kerns, and Raymond L. Sengbush

It is certified that error appears in the above-identified patent and that said Letters Patent are hereby corrected as shown below:

Column 18, line 52 (claim 2), and column 20, line 27 (claim 8), "potion" should read --portion--.

Signed and sealed this 3rd of April 1973.

(SEAL)
Attest:

EDWARD M. FLETCHER, JR.
Attesting Officer

ROBERT GOTTSCHALK
Commissioner of Patents